United States Patent

[11] 3,540,511

| [72] | Inventor | Henri Mirtain<br>Compiegne, France |
|---|---|---|
| [21] | Appl. No. | 720,063 |
| [22] | Filed | April 10, 1968 |
| [45] | Patented | Nov. 17, 1970 |
| [73] | Assignee | Uniroyal Englebert France S.A.<br>Paris, France<br>a corporation of France |
| [32] | Priority | April 27, 1967 |
| [33] | | France |
| [31] | | 104,501 |

[54] PNEUMATIC TIRES
5 Claims, 1 Drawing Fig.

[52] U.S. Cl. ............................................. 152/354,
    152/361
[51] Int. Cl. ...................................... B60c 9/08,
    B60c 9/20, B60c 15/04
[50] Field of Search .......................... 152/354,
    355, 356, 361

[56] References Cited
UNITED STATES PATENTS
3,161,220  12/1964  Beckadolph ................ 152/356

3,363,660  1/1968  Mirtain et al. ................ 152/356
FOREIGN PATENTS
1,111,806  3/1956  France ......................... 152/361
1,148,638  12/1957  France ......................... 152/361

*Primary Examiner*—Arthur L. La Point
*Assistant Examiner*—Howard Beltran
*Attorney*—Norbert P. Holler

ABSTRACT: A radial ply tire construction wherein the carcass comprises a continuous radial inner ply structure and a two-section outer ply structure which is discontinuous and overlapped in the crown region of the tire and the cords or cables of which have a lower coefficient of elongation than the cords of the inner ply structure. Each section of the outer ply structure extends from a respective one of the beads of the tire across the crown region of the carcass under the breaker structure and terminates in the vicinity of the remote lateral edge region of the breaker structure, so as to establish an overlap of the two sections ranging in width from about 50 percent up to not more than about 120 percent of the width of the breaker structure. The overlapped parts of the sections of the outer ply structure of the carcass thus serve as reinforcements for the latter in the region of the breaker.

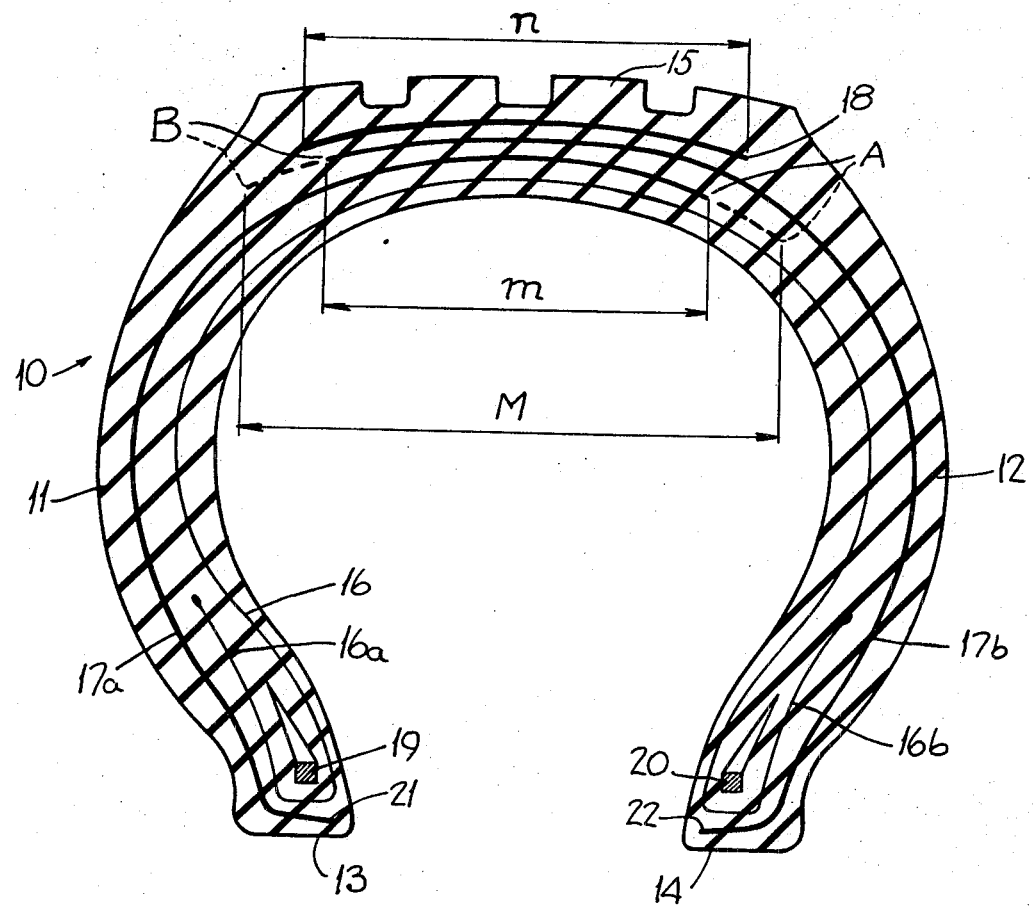

PNEUMATIC TIRES

The foregoing abstract is not to be taken either as a complete exposition or as a limitation of the present invention, and in order to understand the full nature and extent of the technical disclosure of this application, reference must be had to the following detailed description and the accompanying drawing as well as to the claims.

This invention relates to pneumatic tires for vehicles, and more particularly to the type of tires generally called radial or radial ply tires.

The expressions "radial tires" and "radial ply tires" as commonly used in the pneumatic tire art may be said to include various tire constructions having one or more body or carcass reinforcement plies of weftless cord fabric extending from bead to bead wherein the cords or cables in each ply are substantially radial in orientation. Specifically, in a monoply radial tire construction, the cords or cables normally have a high bias angle of 90°, i.e. in the unshaped carcass they are disposed perpendicular to the planes of the beads, and in the finished tire in meridian or radial planes of the same which are perpendicular to the equatorial or circumferential center plane of the tire. In a two-ply radial tire construction, the cords or cables in the two body plies are usually oriented at respective oppositely disposed small angles of up to 10° to the perpendicular to the equatorial plane, in which case the respective body plies are said to have oppositely disposed high bias angles of 80° or greater (but less than 90°). In four-ply or heavier radial tire constructions, similar opposed orientation of the cords in successive body plies is usually employed. All of these body or carcass constructions are contemplated within the scope and meaning of the expressions "radial" and "substantially radial" as used herein.

Radial tires also generally have a breaker or belt interposed between the crown region of the carcass and the tread for reinforcing the latter, such breaker being comprised of one or more plies of usually weftless cord fabric the cords or cables of which are made of generally inextensible materials, e.g. metallic wires, glass filaments, polyester filaments, etc. In a monoply breaker, the cords or cables have a relatively low bias angle of 0°, i.e. they are oriented substantially parallel to the planes of the beads and the equatorial plane or crown centerline of the tire. If the breaker is a multiply structure, similar but opposed low bias orientations of the cords or cables generally at angles ranging up to about 25° or so with respect to the equatorial plane are employed in successive plies.

As disclosed in my copending prior U.S. Pat. application Ser. No. 704,754, filed Feb. 12, 1968, now U.S. Pat. No. 3,509,930, radial tires are possessed of a number of advantages but are also found to be subject to some drawbacks. One of these has been what may be termed a susceptibility of the sidewalls to undergo certain deformations which lead to the generation of stresses and strains that are detrimental to the good behavior of the casing and are a source of fatigue harmful to the longevity of the tire. The basic concept of the invention covered by my aforesaid prior application accordingly was the provision of a radial ply tire construction the carcass of which is sufficiently rigid to limit the deformations of the tire and yet is sufficiently flexible to enable the tire to have a good shock resistance. The means for achieving that objective was the use of a carcass construction composed of at least two superposed cord fabric ply structures, the cords or cables of the inner one being substantially radially oriented and having a higher coefficient of elongation than the cords or cables of the outer ply structure which preferably are also substantially radially oriented, and the outer ply structure being discontinuous without any overlapping of the sections thereof in the crown or tread region of the tire.

As further disclosed in my said application, the presence of the discontinuity or gap between the adjacent edges of the sections of the outer ply structure may make it desirable or necessary at times to provide the tire with an additional belt or breakerlike ply structure extending across such gap, for the purpose of reinforcing the carcass in the region of the discontinuity. The incorporation of such an additional ply structure, however, requires the provision of specially precut plies and makes the overall tire construction more complex, and also entails added expenditures of time, labor and money both in the preparation of such plies and in the tire building operation. Quite obviously, the extra expense may be either unnecessary or unacceptable for certain classes of tires.

It is an object of the present invention, therefore, to provide a radial ply tire construction which has not only the desired rigidity and flexibility characteristics, as set forth in my aforesaid prior application, but at the same time achieves the desired reinforcement of the crown region of the carcass without requiring the use of additional reinforcing plies over the discontinuity between the sections of the outer carcass ply structure.

Another object of the present invention is the provision of such a tire construction which is both simpler and less expensive to produce.

Generally speaking, the objectives of the present invention are attained by overlapping the two sections of the outer ply structure in the crown region of the tire, preferably symmetrically of the midcircumferential or equatorial plane thereof, so that the overlapped portions constitute the desired additional crown reinforcement of the carcass as well. Advantageously, each section of the outer ply structure extends from a respective one of the beads of the tire across the crown region of the carcass under the breaker structure and terminates on the remote side of the midcircumferential or median equatorial plane of the tire, the degree of overlap of the two sections ranging up to not more than about 120 percent of the total width of the breaker structure. In the upper end portion of the range, therefore, the outer ply sections will terminate in or near the shoulders of the tire either beyond or within the confines of the overlying breaker structure. In certain cases, of course, the degree of overlap may be considerably less than, albeit always greater than 0 percent of, the width of the breaker structure, but it is preferred that it be at least on the order of more than about 50 percent of the breaker width.

The foregoing and other objects, characteristics and advantages of the present invention will be more clearly understood from the following detailed description thereof when read in conjunction with the accompanying drawing, the sole FIG. of which is a diagrammatic, transverse section through a tire having a carcass construction according to the present invention and also illustrates the basic dimensional parameters involved.

Referring now to the drawing in greater detail, the tire 10 there shown comprises sidewalls 11 and 12 terminating at their radially inwardmost ends in beads 13 and 14 and merging at their radially outwardmost ends into a tread 15 defining the road-contacting surface of the tire. In accordance with the present invention, the carcass or body of the tire comprises a continuous radial inner ply structure 16 and a two-section radial outer ply structure 17a —17b which is discontinuous, in a manner to be more fully explained presently, in the crown or tread region of the tire beneath the tread-reinforcing breaker structure 18. The opposite end regions of the inner ply structure 16 are preferably turned up around the bead wire bundles or cores 19 and 20 and, as shown at 16a and 16b, extend for a short distance outwardly through the sidewalls 11 and 12, while the remote edge or marginal regions of the outer ply structure 17a —17b extend past the turnups of the inner ply structure and preferably terminate in the regions of the beads 13 and 14, as shown at 21 and 22. It will be understood that either the inner or the outer ply structure or the breaker structure or all of them may be of either monoply or multiply construction.

As in the case of the tire constructions disclosed in my aforesaid prior application, the cords or cables in the inner ply structure of the carcass according to the present invention are possessed of a higher coefficient of elongation, i.e. they are more stretchable, than the cords or cables of the outer ply structure. Thus, the inner ply structure may use cords or cables of any suitable natural or synthetic textile material such as nylon, rayon, polyester, glass fiber, etc., having an appropriate relatively high coefficient of elongation, while the outer ply structure may use cords or cables of any suitable material, advantageously metal wires, *e.g.* steel, having an appropriate relatively low coefficient of elongation and preferably one which is much lower than that of the cord material in the inner ply structure.

By way of distinction from the prior construction, however, the proximate marginal regions of the sections 17a and 17b of the outer ply structure according to the present invention extend from the beads 13 and 14 in under the breaker structure 18 and equal distances across the crown region of the tire so as to terminate, as shown at A and B, symmetrically with respect to the midcircumferential or equatorial plane of the tire and in the vicinity of, *i.e.* before or beyond, the respective remote lateral edges of the breaker structure. The transverse extent or width of the region of overlap of the outer ply structure sections, *i.e.* the dimension A—B, thus may range from a width $m$ less than the width $n$ of the breaker structure 18 to a width M greater than $n$. Preferably, M should not exceed about $1.20n$, and although $m$ may be considerably less than $n$ (but greater than zero), it is preferred that $m$ be greater than $0.50n$.

It will be understood that, especially with the cords or cables of the outer ply structure being made of metal, such as steel wires, the overlapped portions of the two sections of the outer ply structure play the role of an additional breakerlike ply structure interposed between the breaker structure and the carcass to reinforce the latter in the crown region. This arrangement makes it possible to achieve substantial savings in the manufacture of such tires, since the need for extra precut and individually built up reinforcement plies to be interposed between the breaker and the crown region of the carcass is effectively eliminated. Where requirements so dictate, such a reinforcement may, of course, be used in conjunction with precut and individually applied reinforcing plies. Likewise, in an arrangement according to the present invention, the cords in one of the outer ply sections may be nonradially oriented, as set forth in my aforesaid prior application.

Irrespective of the specific combination of structural details and features incorporated in a tire carcass constructed in accordance with the present invention, a cured tire reinforced thereby will be possessed of the same advantages which characterize the constructions disclosed in my said prior application. Thus, in the case of a tire utilizing cords or cables of nylon in the inner ply structure and steel wires in the outer ply structure, the casing will exhibit a uniform geometric configuration by virtue of the low coefficient of elongation of the steel, and at the same time the carcass will have a good shock resistance by virtue of the presence of the nylon cords. Also, the manufacture of such tires as are herein contemplated will not require the use of special materials, such as centripetal segments in the tire molds, because the elongation properties of the stretchable inner ply structure cord material, *e.g.* nylon, are sufficient to permit the extension of the carcass in an ordinary mold, which extension is also not impeded by the low elongation material in the outer ply structure due to the discontinuity in the latter.

Although carcasses constructed in accordance with the present invention find their primary applicability in heavy service tires, it is contemplated that the principles disclosed herein may be embodied in any size tire.

It is to be understood, therefore, that the foregoing description of preferred embodiments of the present invention is for purposes of illustration only, and that the basic constructions and structural features and relationships herein disclosed may be modified in a number of ways none of which entails a departure from the spirit and scope of the present invention as defined in the hereto appended claims.

I claim:

1. In a radial ply tire having a carcass, sidewalls overlying the lateral portions of said carcass and terminating in respective beads at their radially inwardmost ends, a tread surrounding the crown region of said carcass, and a breaker structure interposed between said carcass and said tread for reinforcing the latter; said carcass comprising an inner ply structure which is continuous from bead to bead, and a two-section outer ply structure which is discontinuous in the crown region of said carcass, the cords in at least one section of said outer ply structure being substantially radially oriented, the cords in said inner ply structure being substantially radially oriented and having a higher coefficient of elongation than the cords in said outer ply structure, and each of said sections of said outer ply structure extending from the region of its associated bead toward and across the crown region of said carcass under said breaker structure and terminating on the respective remote side of the median equatorial plane of the tire, the distance between the free lateral edges of the so overlapped parts of said sections ranging from about 50 percent up to not more than about 120 percent of the total width of said breaker structure, and the overlapped parts of said sections constituting a reinforcement for the crown region of said carcass.

2. In a radial ply tire according to claim 1; the width of the region of overlapping of said sections of said outer ply structure being greater than the total width of said breaker structure.

3. In a radial ply tire according to claim 1; the width of the region of overlapping of said sections of said outer ply structure being less than the total width of said breaker structure.

4. In a radial ply tire according to claim 1; the cords in said ply structures being made of respectively appropriate materials selected from the group consisting of natural and synthetic textile fibers and metal.

5. In a radial ply tire according to claim 1; the cords in said inner ply structure being made of nylon, and the cords in said outer ply structure being made of steel.